United States Patent [19]

Johannesson et al.

[11] 4,265,137
[45] May 5, 1981

[54] GEAR SELECTOR MECHANISM FOR A VEHICLE GEARBOX

[75] Inventors: Stig-Erik Johannesson, Kungälv; Stanislaw J. Kruk, Västra Frölunda, both of Sweden

[73] Assignee: AB Volvo, Goteborg, Sweden

[21] Appl. No.: 25,454

[22] Filed: Mar. 29, 1979

[30] Foreign Application Priority Data

Apr. 3, 1978 [SE] Sweden .............................. 7803713

[51] Int. Cl.³ .............................................. B60K 20/02
[52] U.S. Cl. ....................................... 74/473 R; 74/339
[58] Field of Search ................. 74/473 R, 473 P, 339, 74/356, 357, 359; 192/82 R

[56] References Cited

U.S. PATENT DOCUMENTS

| 1,134,681 | 4/1915 | King ........................................ 74/473 |
| 1,787,766 | 1/1931 | Smith ...................................... 74/473 |
| 2,191,543 | 2/1940 | Osborne ................................. 74/473 |
| 2,217,728 | 10/1940 | Burt ......................................... 74/473 |
| 2,442,660 | 6/1948 | Neracher ............................ 74/473 R |

FOREIGN PATENT DOCUMENTS

| 2456962 | 12/1975 | Fed. Rep. of Germany ........ 74/473 R |
| 2547476 | 3/1977 | Fed. Rep. of Germany ........ 74/473 R |
| 2805044 | 8/1979 | Fed. Rep. of Germany ........ 74/473 R |

Primary Examiner—C. J. Husar
Assistant Examiner—Philip W. Thor
Attorney, Agent, or Firm—Young & Thompson

[57] ABSTRACT

A gear selector mechanism for a vehicle gearbox comprises axially displaceable shift rails and rocker forks joined thereto. Upon axial displacement of the shift rails, the rocker forks can swing to displace engaging sleeves in the coupling and synchronizing means of the gearbox. A plurality of rocker forks are journalled in a common fork holder formed by two parallel bars arranged at a distance from each other and oriented in the direction of the gearbox shaft.

4 Claims, 2 Drawing Figures

U.S. Patent
May 5, 1981
4,265,137
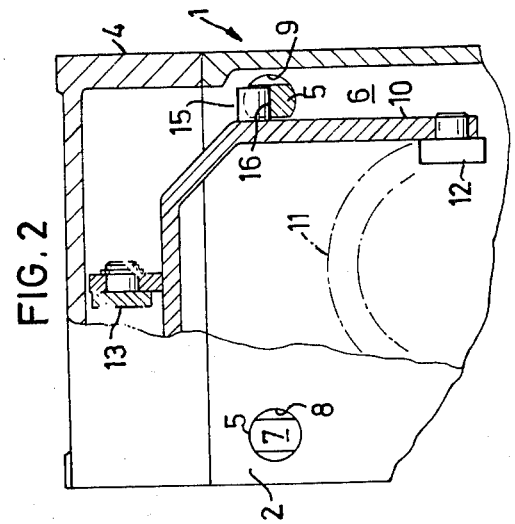
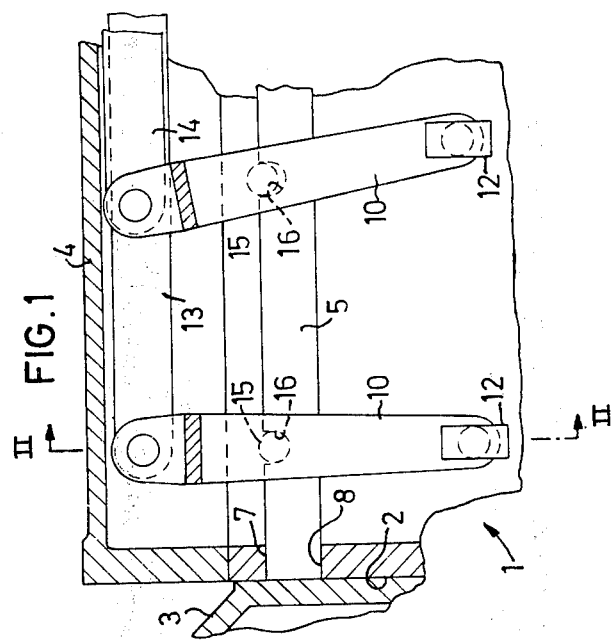

GEAR SELECTOR MECHANISM FOR A VEHICLE GEARBOX

The present invention relates to a gear selector mechanism for a vehicle gearbox, comprising axially displaceable shift rails and rocker forks joined to the shift rails, said rocker forks being swingable upon axial displacement of the shift rails to displace engaging sleeves in the coupling and synchronizing means of the gearbox.

Gear selector mechanisms of this type are known in which the rocker forks are journalled individually in the sides of the gearbox housing. Usually the forks are journalled with needle bearings or slide bearings on pins which are fixed in holes in the sides of the gearbox housing. Narrow tolerance requirements are placed on the pins and holes. Also great demands are placed on the correct positioning of the holes. Thus a construction of this type is expensive, but in return it is highly efficient. A less expensive known gear selector mechanism has shift forks, fixed to shift rails which are axially displaceable in bushings in the gearbox housing, the forks moving axially together with said rails. This construction has a lower degree of efficiency, however.

The purpose of the present invention is to achieve a gear selector mechanism of the type described in the introduction which is simple in design and inexpensive to manufacture while still being highly efficient.

This is achieved according to the invention by a plurality of rocker forks being journalled in a common fork holder in the form of a pair substantially parallel of bars arranged at a distance from one another, and oriented in the direction of the gearbox shaft.

The mechanism according to the invention eliminates the need for a number of exact machining steps, inter alia of the sides of the housing. For example, the gear selector mechanism in a six-gear gearbox of conventional type and equipped with rocker forks requires, among other things, eight precision-tooled pins with bearings, eight precision-tooled holes and eight threaded holes, all of which are replaced according to the invention with a pair of simple, parallel bars with bearings for the bearing pins of the forks. The invention also makes possible more rapid assembly due to the substantially reduced number of parts. Furthermore, adjustment of the position of the gears in relation to the gear shift blocking mechanism is simplified.

The invention will be described in more detail with reference to the accompanying drawing showing an embodiment, in which FIG. 1 shows schematically a longitudinal section through a portion of a gearbox with a gear selector mechanism according to the invention, and FIG. 2 shows a cross section along the line II—II in FIG. 1.

FIG. 1 shows a portion of a gearbox housing 1 which is fixed with its front end 2 by means of bolts (not shown) against a clutch housing indicated at 3. The housing cover is labelled 4.

According to the invention, a fork holder in the form of two parallel bars 5 extends through the entire housing from its front end 2 to its rear end 6. The bars 5 consist of machined flat-rolled steel placed on edge, the ends 7 of which extend into holes 8 and 9 in the front end 2 and rear end 6 of the gearbox housing, respectively. The bars 5 can be fixed in holes 8 and 9 by forced fitting or in some other suitable manner (not shown). During assembly, the bars are inserted simply through the holes 8 in the front housing end and are then held securely in place when the housing 1 is bolted fast to the clutch housing 3.

The bars 5 carry rocker forks 10 which displace, in a conventional manner, the engaging sleeves in the coupling and synchronizing means (not shown) of the gearbox. An engaging sleeve 11 is indicated schematically in FIG. 2. The rocker forks 10 carry at their fork ends rotatable actuators 12 which engage, in a known manner, in a peripheral groove in the sleeve 11. At its opposite end, each fork 10 is articulated on a shift rail 13 or 14, respectively. The rocker forks 10 have a pair of bearing pins 15 extending to the sides and which rest in U-shaped, upwardly opening grooves or cavities 16 in the bars 5.

FIG. 1 shows the left-hand rocker fork 10 in the neutral position and the right-hand rocker fork 10 in a gear-engaged position. When a fork 10, with the aid of the associated shift rail 13 or 14, is rocked from the neutral position to a gear position, the bearing pins 15 roll in the cavities 16, as can be seen from the right-hand fork in FIG. 1. This provides low friction with a resulting high degree of efficiency.

In addition to the above-mentioned advantages, the gear selector mechanism according to the invention enables the same gearbox housing to be used for gearboxes with varying numbers of speeds without the necessity of modifying the housing itself as regards the journalling and placement of varying number of forks.

In this manner it is sufficient to adapt the fork holder formed by the bars to the gearbox type in question.

What we claim is:

1. Gear selector mechanism for a vehicle gearbox, comprising axially displaceable shift rails and rocker forks joined to the shift rails, said rocker forks being swingable upon axial displacement of the shift rails to displace engaging sleeves in the coupling and synchronizing means of the gearbox, characterized in that a plurality of rocker forks are journalled in a common fork holder in the form of a pair of substantially parallel bars arranged at a distance from one another and oriented in the direction of the gearbox shaft.

2. Gear selector mechanism according to claim 1, characterized in that the rocker forks have bearing pins extending from opposite sides, and in that the bars are made with upwardly open, U-shaped grooves for receiving the bearing pins.

3. Gear selector mechanism according to claim 1 or 2, characterized in that the bars extend through the entire housing of the gearbox and penetrate into openings in the ends of the housing.

4. Gear selector mechansim according to any one of claims 1 to 3, characterized in that the bars are formed of flat-rolled steel placed on edge.

* * * * *